(12) United States Patent
Stamirski

(10) Patent No.: US 10,221,829 B2
(45) Date of Patent: Mar. 5, 2019

(54) MODULAR, SCALABLE AND MOBILE WAVE ENERGY CONVERSION ARRANGEMENT

(71) Applicant: Maciej Stamirski, Katowice (PL)

(72) Inventor: Maciej Stamirski, Katowice (PL)

( * ) Notice: Subject to any disclaimer, the term of this patent is extended or adjusted under 35 U.S.C. 154(b) by 207 days.

(21) Appl. No.: 15/121,824

(22) PCT Filed: Feb. 27, 2014

(86) PCT No.: PCT/PL2014/000016
§ 371 (c)(1),
(2) Date: Aug. 26, 2016

(87) PCT Pub. No.: WO2015/130181
PCT Pub. Date: Sep. 3, 2015

(65) Prior Publication Data
US 2017/0074231 A1    Mar. 16, 2017

(51) Int. Cl.
*F03B 13/14*    (2006.01)
*F03B 13/20*    (2006.01)
(Continued)

(52) U.S. Cl.
CPC .............. *F03B 13/20* (2013.01); *F03B 13/14* (2013.01); *F05B 2240/40* (2013.01);
(Continued)

(58) Field of Classification Search
CPC ....................... F03B 13/12–13/24; Y02E 10/38
(Continued)

(56) References Cited

U.S. PATENT DOCUMENTS 2,640,326 A * 6/1953 Hunter .................. F03B 13/181
405/30
4,076,464 A * 2/1978 Pinney .................... F03B 13/20
417/332
(Continued)

FOREIGN PATENT DOCUMENTS

DE    2415517 A1 * 10/1974 .............. F03B 13/20
DE    4310998 A1 * 11/1993 .............. F03B 13/20
(Continued)

OTHER PUBLICATIONS

International Preliminary Report on Patentability for PCT/PL2014/000016 (favourable).
(Continued)

*Primary Examiner* — Laert Dounis

(57) ABSTRACT

A wave energy conversion arrangement comprising—at least two modules (M1, M2) each of which comprises—at least one first float (P1) and at least one second float (P2) coupled mechanically with each other by means enabling for reciprocal and independent displacing of these floats in relation to each other over a predetermined length segment along separate straight lines parallel to each other; —at least one elementary energy conversion arrangement (7) using reciprocating movement of said at least one first float (P1) of a given module (M1, M2) relative to said at least one second float (P2) of this module (M1, M2), —connecting means (16) for alternative detachable connecting with each other—; —wherein said elementary energy conversion arrangements (7) of the adjoining modules (M1, M2) are energetically coupled with each other constituting a main energy conversion arrangement (15).

9 Claims, 7 Drawing Sheets

Figure 1:
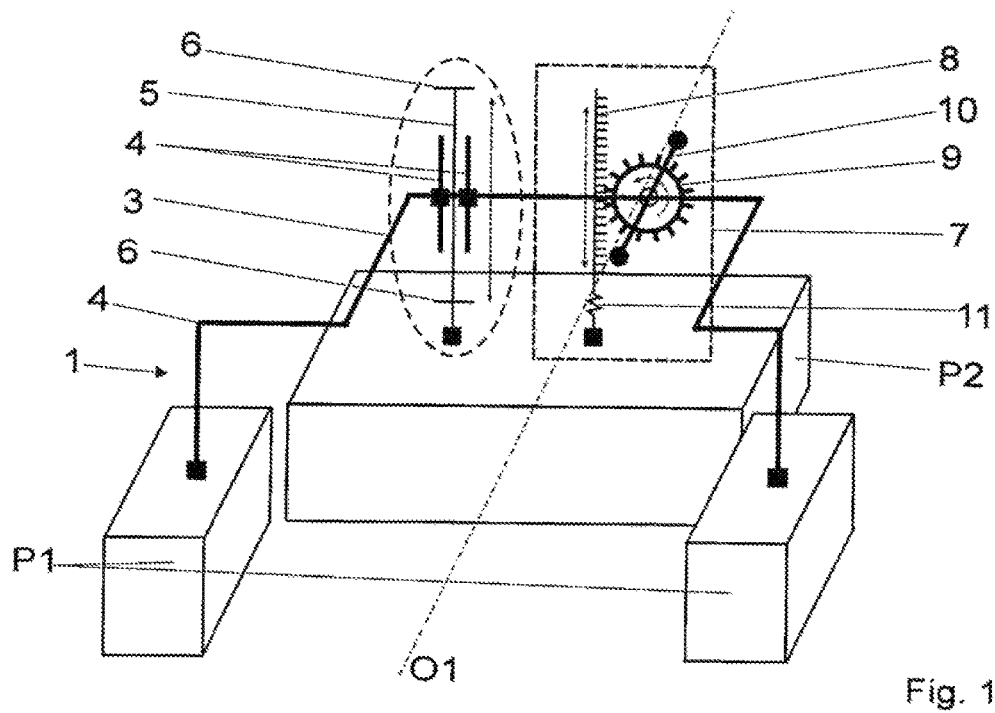

(51) Int. Cl.
*F16H 19/04* (2006.01)
*F16H 31/00* (2006.01)

(52) U.S. Cl.
CPC .......... *F05B 2240/93* (2013.01); *F16H 19/04* (2013.01); *F16H 31/001* (2013.01); *Y02E 10/38* (2013.01)

(58) Field of Classification Search
USPC ................................ 60/495–507; 290/42, 53
See application file for complete search history.

(56) References Cited

U.S. PATENT DOCUMENTS

| | | | | |
|---|---|---|---|---|
| 4,098,084 | A | * | 7/1978 | Cockerell ............... F03B 13/20 417/332 |
| 4,285,196 | A | | 8/1981 | Ekstrom et al. |
| 4,622,473 | A | | 11/1986 | Curry |
| 5,710,464 | A | | 1/1998 | Kao et al. |
| 8,035,243 | B1 | | 10/2011 | Mesa |
| 8,319,360 | B1 | | 11/2012 | Omer |
| 2007/0257491 | A1 | * | 11/2007 | Kornbluh ............ F03B 13/1845 290/53 |
| 2008/0036213 | A1 | | 2/2008 | Storbekk |
| 2009/0066085 | A1 | | 3/2009 | Gray |
| 2011/0057448 | A1 | * | 3/2011 | Page ........................ F03B 13/20 290/53 |
| 2011/0061377 | A1 | * | 3/2011 | Preftitsis ................ F03B 13/20 60/500 |
| 2011/0163547 | A1 | | 7/2011 | Frishberg |
| 2012/0007363 | A1 | | 1/2012 | Wang |

FOREIGN PATENT DOCUMENTS

| | | | | |
|---|---|---|---|---|
| DE | 102008050238 A1 | * | 4/2010 | ............. F03B 13/20 |
| FR | 721688 A | * | 3/1932 | ............. F03B 13/20 |
| FR | 872125 A | | 5/1942 | |
| FR | 2995034 A1 | * | 3/2014 | ............. F03B 13/20 |
| GB | 291265 A | | 5/1928 | |
| JP | S5472343 A | | 6/1979 | |
| JP | 57143168 A | * | 9/1982 | ............. F03B 13/20 |
| JP | S57143168 A | | 9/1982 | |
| JP | 2002138941 A | | 5/2002 | |

OTHER PUBLICATIONS

Response to International Search Report for PCT/PL2014/000016.
International Search Report and Written Opinion of ISA for PCT/PL2014/000016.
Written Opinion of the IPEA for PCT/PL2014/000016 (unfavourable).

* cited by examiner

MODULAR, SCALABLE AND MOBILE WAVE ENERGY CONVERSION ARRANGEMENT

The present invention relates to a wave energy conversion arrangement comprising at least two modules, constructionally substantially similar to each other, each of which comprises one first float, at least one elementary energy conversion arrangement using movement of said one first float; connecting means for detachably connecting with each other said one first float of a given module with said one first float of the adjoining module; wherein said elementary energy conversion arrangements of the adjoining modules are energetically coupled with each other forming a main energy conversion arrangement, as disclosed for example in the U.S. Pat. No. 5,710,464.

From the prior art wave energy conversion arrangements are known comprising arrangements for absorbing and converting energy of movements of a number of floats being dislocated by water reservoir waves relative to one common reference system that is immovable or substantially immovable relative to waves. Such a reference system may be for example a seabed, seashore or a massive hull floating on the surface of a water reservoir or totally immersed therein.

Examples of such solutions are disclosed for example in the following patent applications: U.S. Pat. No. 4,622,473, GB291265, FR872125, U.S. Pat. No. 8,319,360. In the present application the arrangements of this first group of solutions are called as transversal configurations because a generated relative movement of floats relative to a hull (or hulls) being substantially immoveable relative to waves concerns objects disposed transversally relative to waves. In this case for example one object is in a manner of speaking disposed on wave whereas another object is in a manner of speaking disposed "next to" wave.

From the prior art also wave energy conversion arrangements are known comprising arrangements for absorbing and converting energy of intermutual movements of a number of floats dislocated by water reservoir waves relative to each other. An example of such a solution is disclosed in patent application US2008036213 describing an arrangement for absorbing sea wave energy employing induced by waves dislocations of floats in relation to each other along a number of straight lines parallel to each other. In the present application the arrangements of this second group of solutions are called as longitudinal configurations because a generated intermutual movement of floats relative to each other concerns objects disposed longitudinally relative to waves. In this case for example one object is in a given moment disposed on the trough of a given wave while another object is disposed on the crest of the same wave.

Depending on water reservoir wave condition, in particular depending on wave length and height, from the wave energy absorption efficiency point of view, in some cases a solution from the group of transversal configurations may be more preferable, while in other cases a solution from the group of longitudinal configurations is preferable.

In consideration of a relocation possibility, wave energy conversion arrangements that are not fixed to seabed or seashore are considered as more preferable and more versatile. Furthermore when considering efficiency of wave energy absorption, in particular absorption of energy of small height waves, a wave energy conversion arrangement in which all floats move along a set of straight lines parallel to each other, seems to be more preferable.

It has been the object of the present invention to provide a wave energy conversion arrangement that operates in an effective manner during variable wave conditions of a water reservoir.

SUMMARY OF THE INVENTION

Accordingly, the invention provides a mobile wave energy conversion arrangement comprising
- at least two modules aligned serially with each other forming a row defining the longitudinal axis of the wave energy conversion arrangement, each of which comprises
  - at least one first float and at least one second float coupled mechanically with each other by means enabling for reciprocating displacing of these floats in relation to each other over a predetermined length along separate straight lines parallel to each other;
  - at least one elementary energy conversion arrangement using reciprocating movement of said at least one first float of a given module relative to said at least one second float of this module;
- connecting means for alternative detachable connecting with each other
  - either said at least one first float of a given module with said at least one second float of the adjoining module fixedly and transversely relative to the longitudinal axis,
  - or said at least one first float of a given module with said at least one first float of the adjoining module fixedly and longitudinally relative to the longitudinal axis and/or said at least one second float of a given module with said at least one second float of the adjoining module fixedly and longitudinally relative to the longitudinal axis;
- wherein said elementary energy conversion arrangements of the adjoining modules are energetically coupled with each other forming a main energy conversion arrangement.

The elementary energy conversion arrangement preferably comprises a mechanical gearing driving a main power transmission axle, wherein the main power transmission axles of the modules, that are directly coupled with each other, are connected by means enabling for independent displacing of these axles in relation to each other along straight lines of displacement of the floats to which floats the axles are fixed.

The main power transmission axles of the adjoining modules are preferably coupled with each other by means of a telescopic jointed shaft or pantographic jointed shaft.

Said mechanical gearing is preferably a linear toothed gear comprising a toothed bar connected with the first float or the second float of a given module which drives the toothed wheel connected respectively with the second float or the first float of the module, wherein the gearing enables for converting a reciprocal movement of the toothed bar of a variable amplitude into a unidirectional rotational movement of the main power transmission axle.

The elementary energy conversion arrangement preferably comprises a pump arrangement, preferably hydraulic pump arrangement.

The pump arrangements of the elementary energy conversion arrangements coupled together are preferably connected with each other fluidly and unidirectionally by means, preferably by deformable conduits, enabling for independent displacing of these pump arrangements in relation to each other along straight lines of displacement of the floats which the pump arrangements are fixed to.

The first float or the second float of a given module is preferably located next to respectively the second float or the first float of the adjoining module.

The at least one second float of a given module is preferably located between the first floats of the adjoining module connected with each other by means of a connecting structure.

In one module of preferred embodiment of the arrangement according to the present invention the at least one second float is preferably located between the first floats connected with each other by means of a connecting structure.

The present invention enables for combination of advantageous features of longitudinal and transversal configurations, each of which in the known solutions is utilized separately in a less effective manner during variable wave conditions of a water reservoir.

The arrangement according to the present invention may be quickly and efficiently transformed from one configuration (for example from a transversal configuration) into another configuration (for example into a longitudinal configuration). The arrangement proposed by the present invention may also be transformed into a hybrid configuration of the longitudinal and transversal configurations, in which for example the sections of a transversal configuration are coupled between the sections of a longitudinal configuration.

The present invention enables for modifying lengths of floats and adjusting float lengths appropriately according to changes of wave length in order to improve efficiency, for example in a longitudinal configuration.

Furthermore, the present invention enables for appropriate reconfiguring a float configuration in a response to a change of wave height in order to prevent the arrangement from damage, such as for example breakage or disruption of for example a longitudinal configuration during high waves.

The present invention provides an optimization of operation and power generated by the whole arrangement by providing a possibility of dynamic adjustment thereof according to wave length and height.

Furthermore, practical industrial implementation of the arrangement according to the present invention is facilitated by providing unique innovative combination of mobility, modularity and scalability. The present invention may be used regardless of a location of utilization, shore configuration, seabed configuration or basin depth (the arrangement according to the present invention may operate also on shallow areas). The arrangement according to the present invention may be relocated as the need arises, for example by means of a tug boat, from the place of its assembling or maintenance inspection place to different locations of utilization.

Modularity of the arrangement according to the present invention facilitates its industrial production and makes it economically competitive. Additionally installation of the arrangement according to the present invention is simple. The arrangement may be assembled in a graving dock, and subsequently it may be combined or divided in a place of bringing into operation. In a case of a breakdown of individual modules, the damaged modules may be thrown out of the arrangement in operation and replaced with operative modules.

Figure 2:
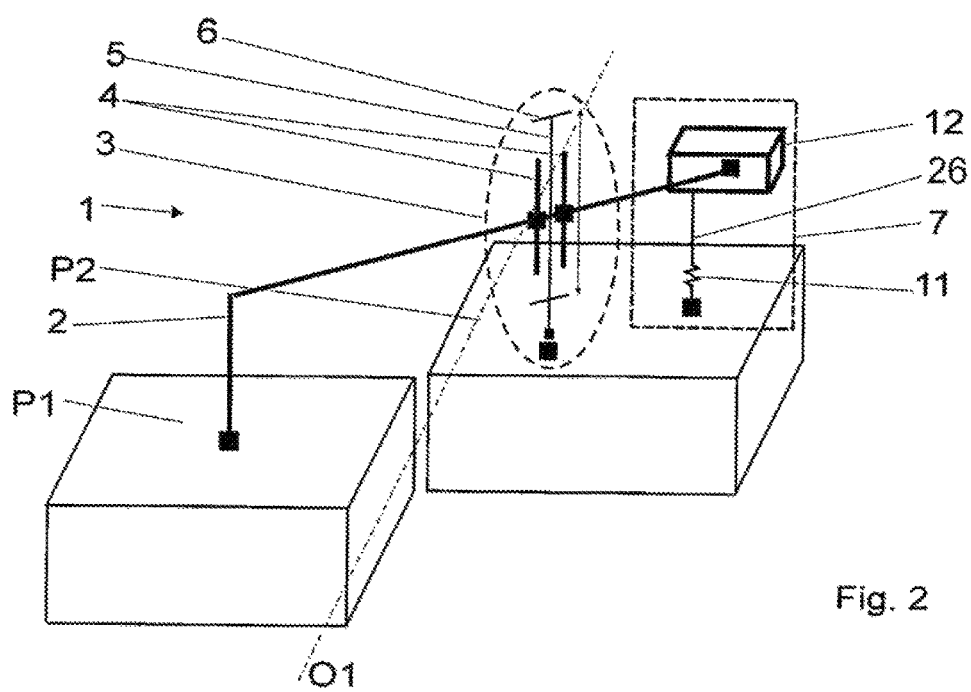
Figure 3:
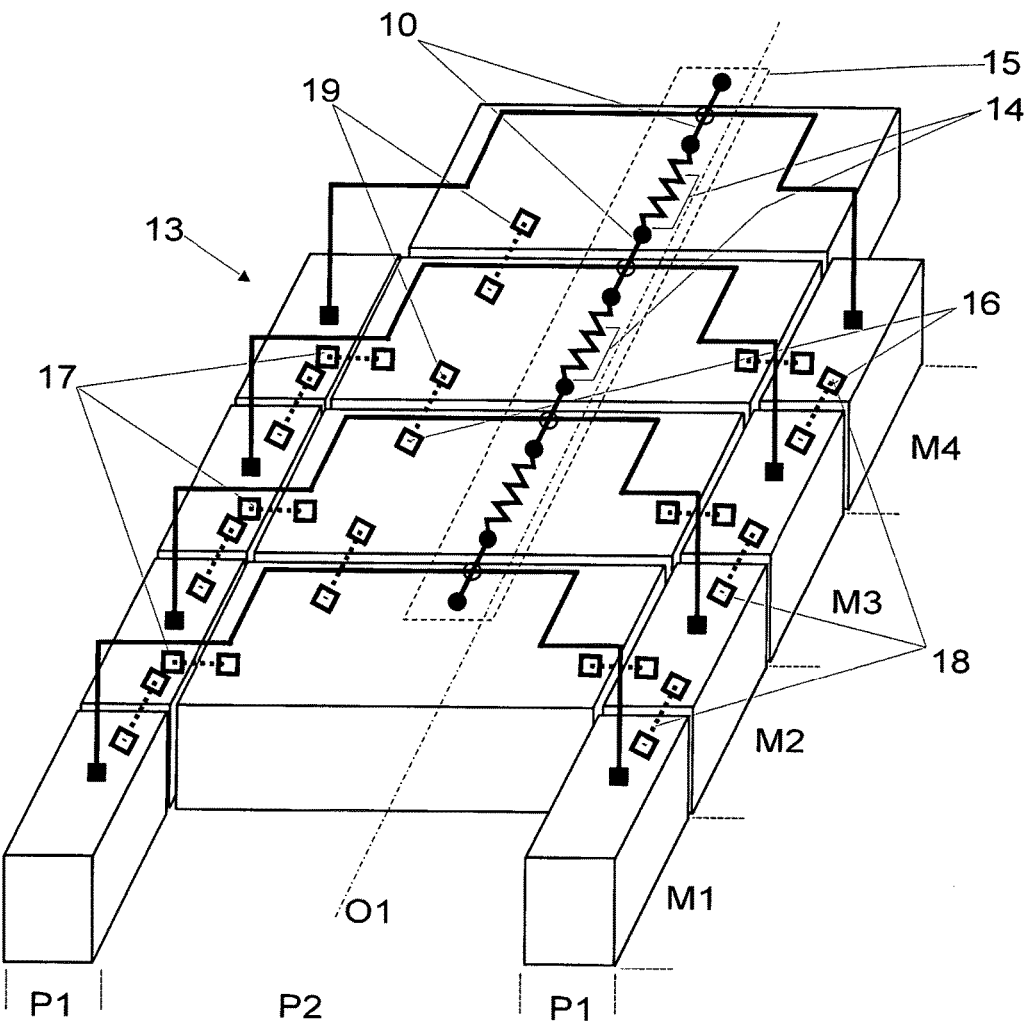
Figure 4:
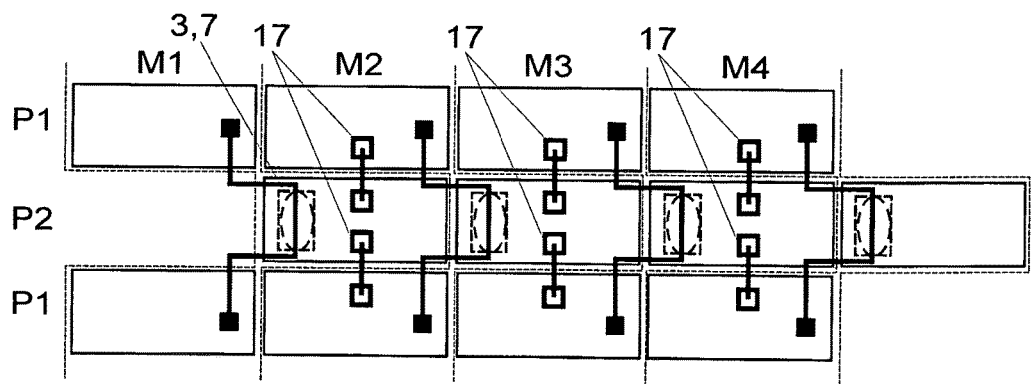
Figure 5:
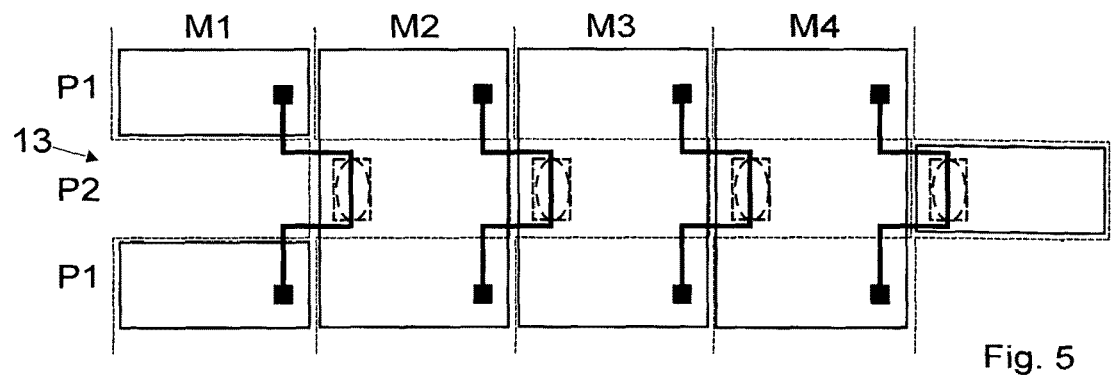
Figure 6:
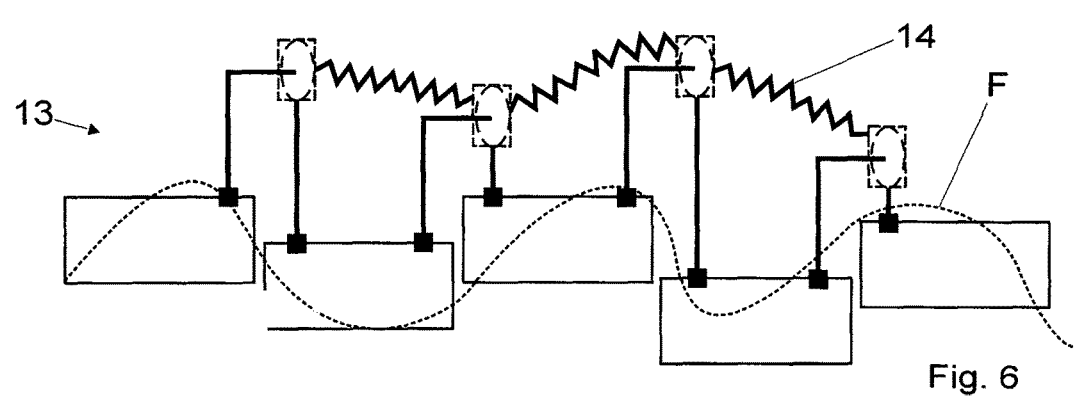
Figure 7:
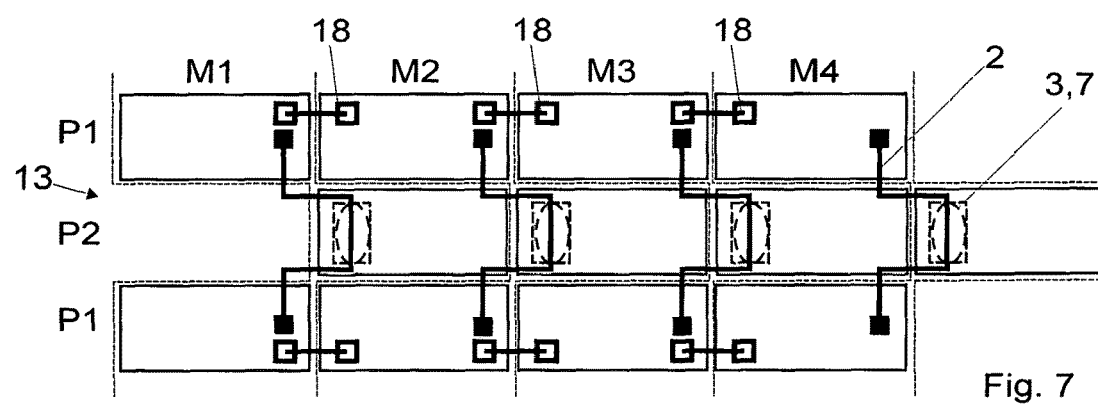
Figure 8:
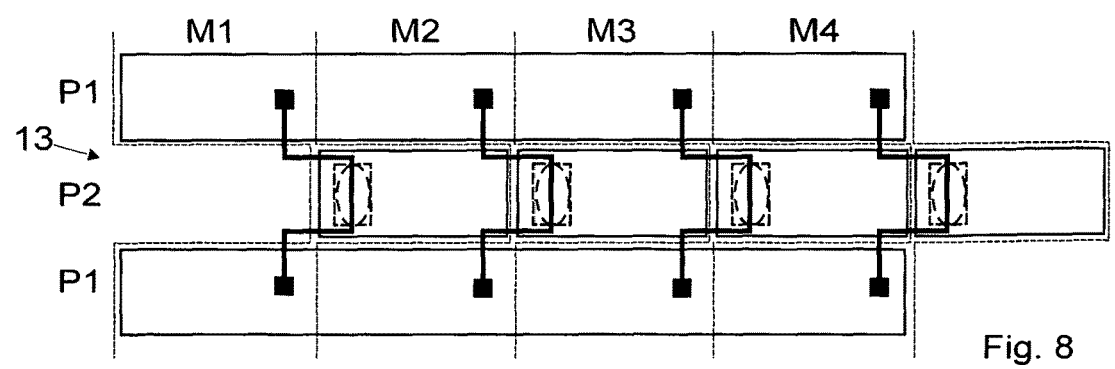
Figure 9:
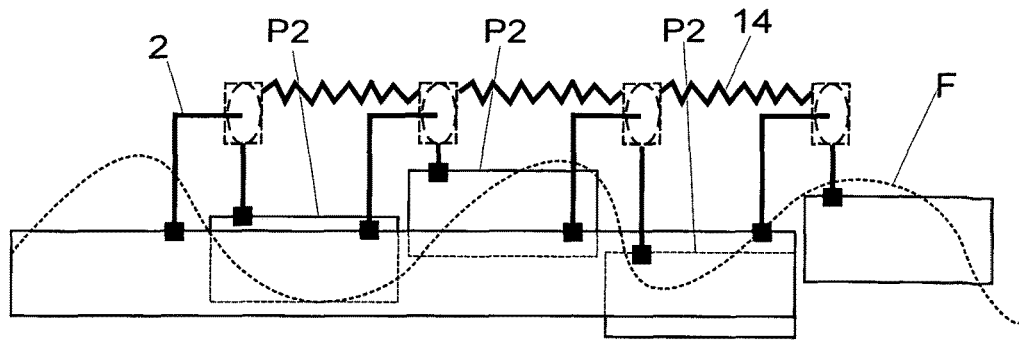
Figure 10:
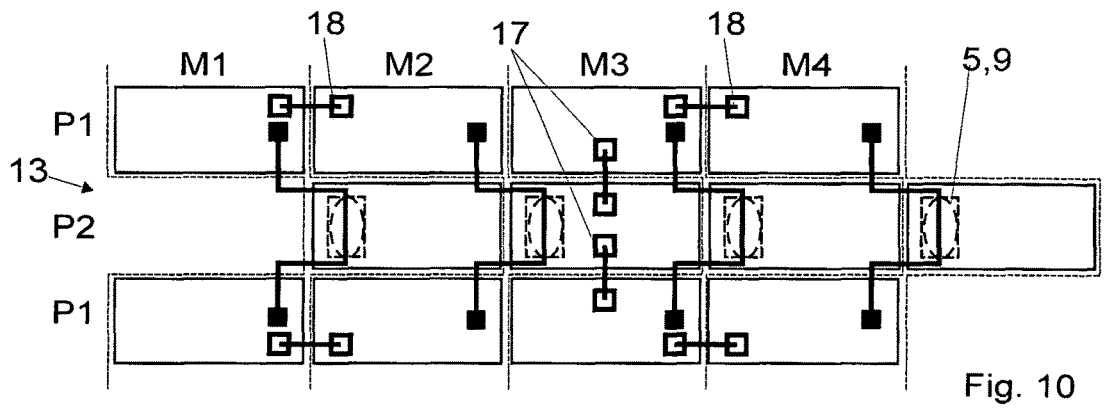
Figure 11:
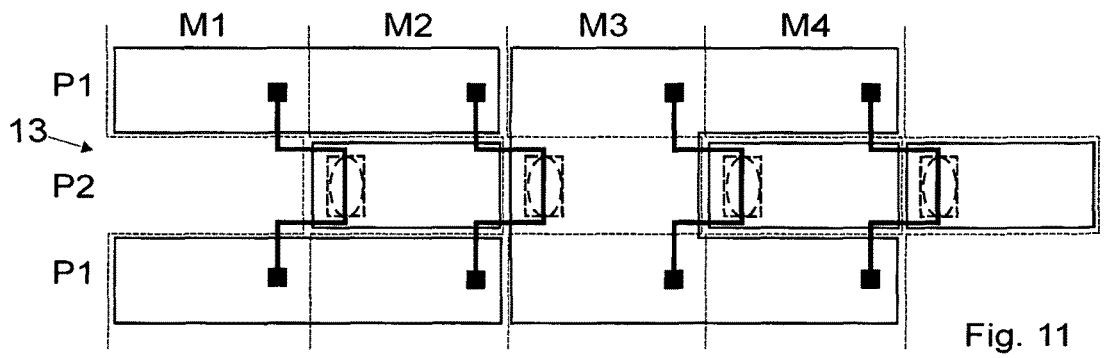
Figure 12:
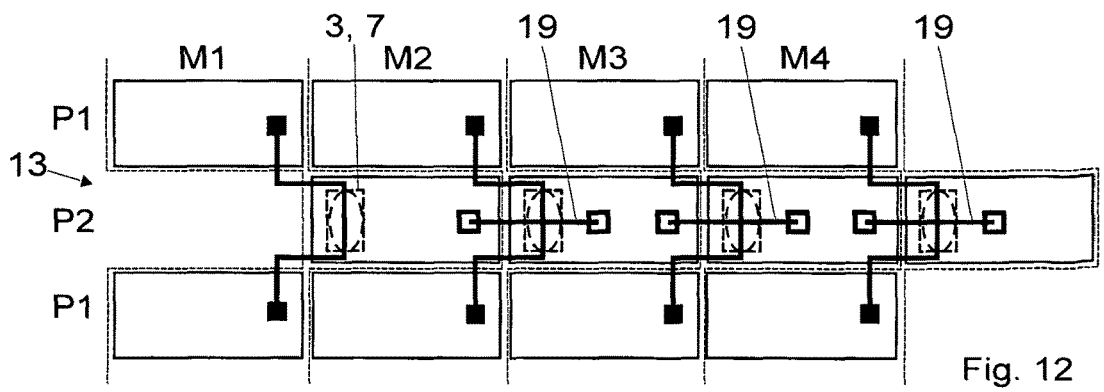
Figure 13:
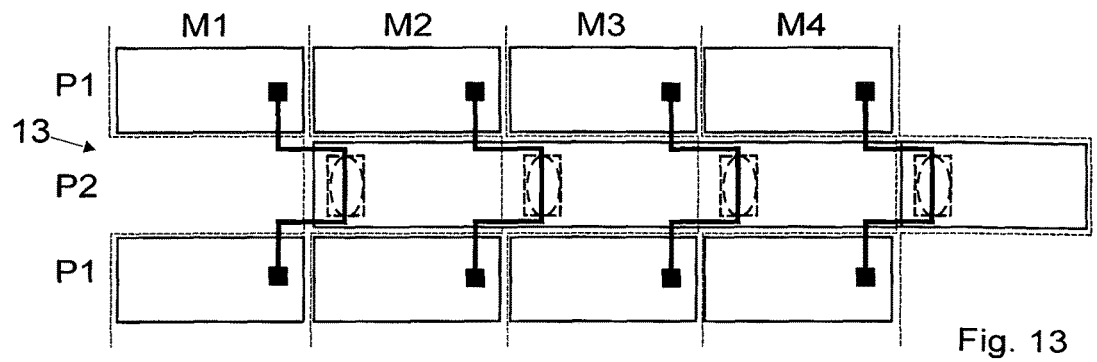
Figure 14:
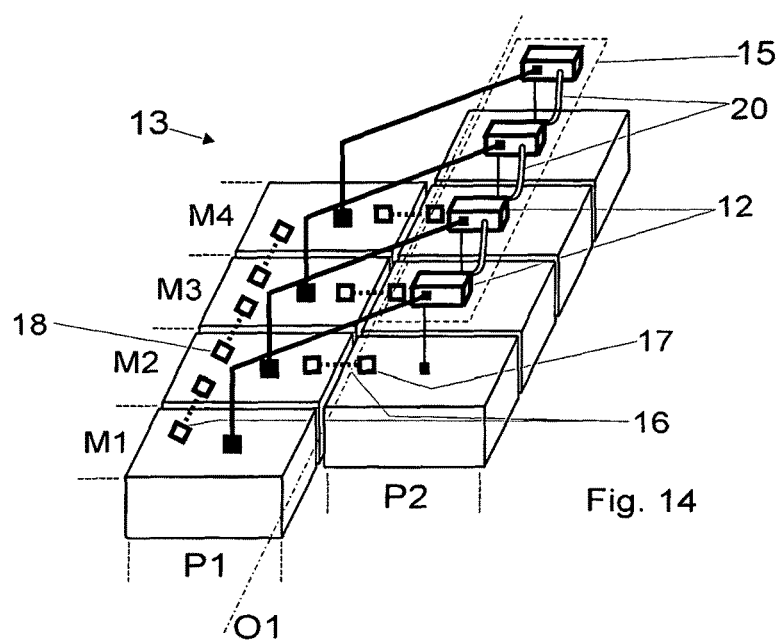
Figure 15:
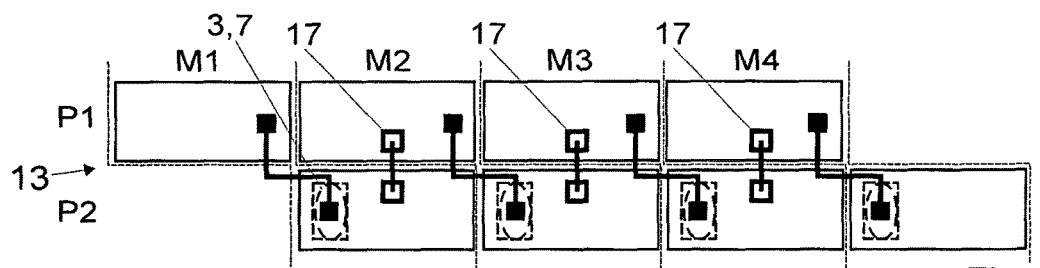
Figure 16:
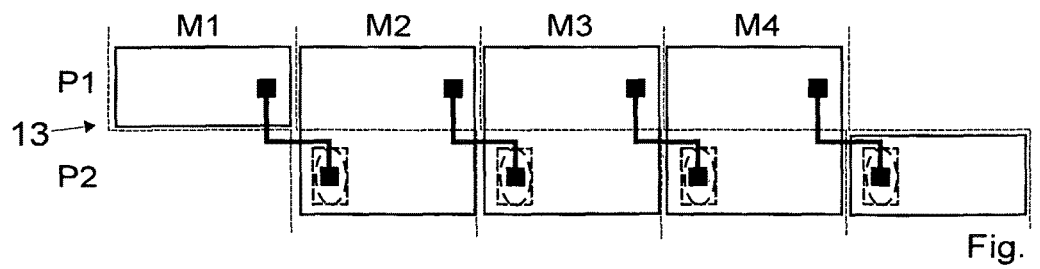
Figure 17:
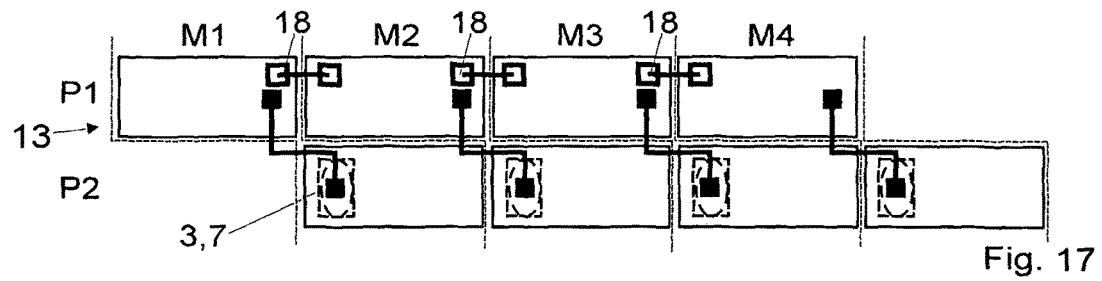
Figure 18:
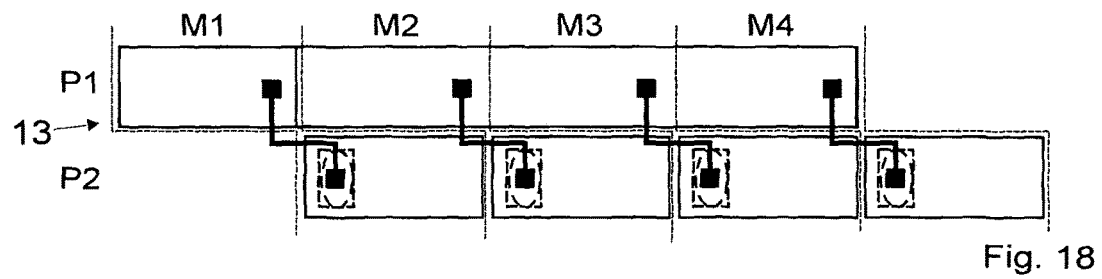
Figure 19:
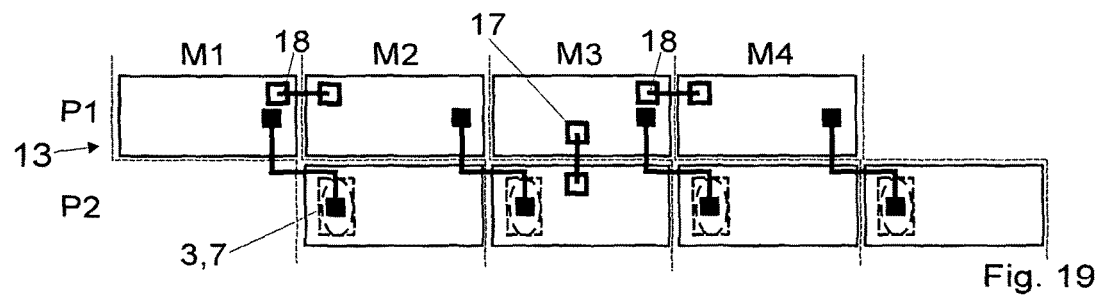
Figure 20:
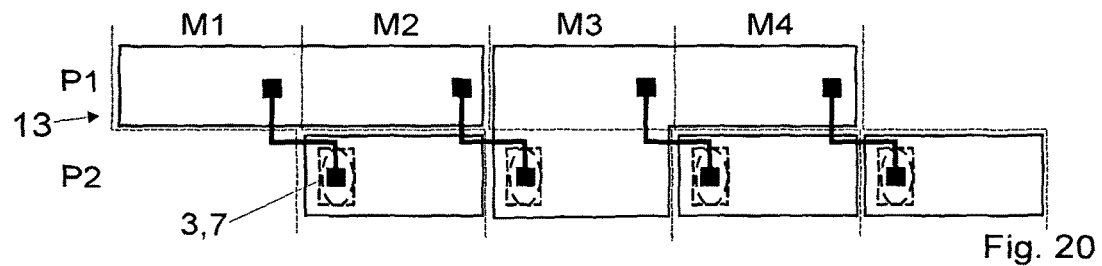
Figure 21:
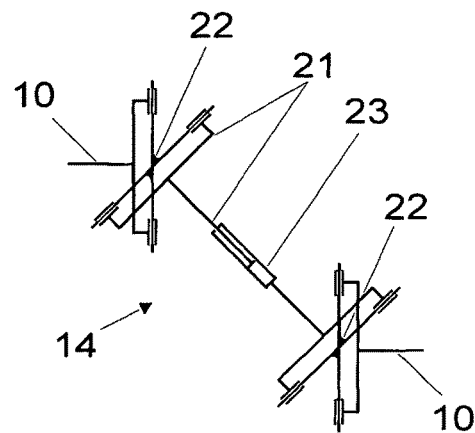
Figure 22:
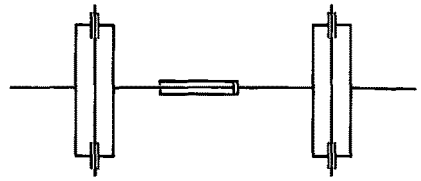
Figure 23:
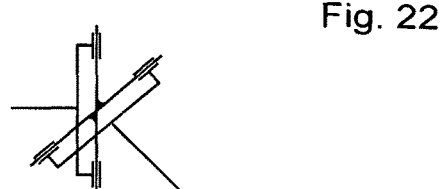
Figure 24:
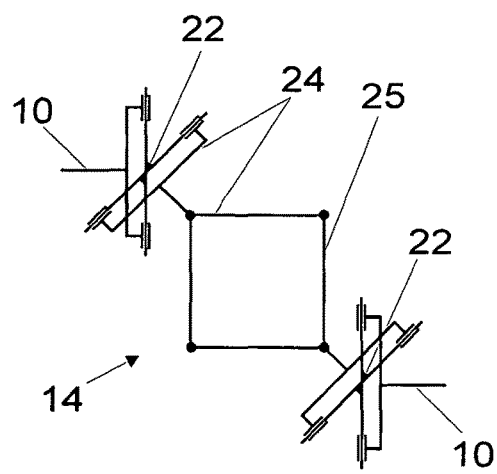
Figure 25:
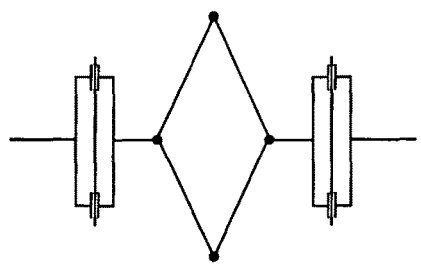
Figure 26:
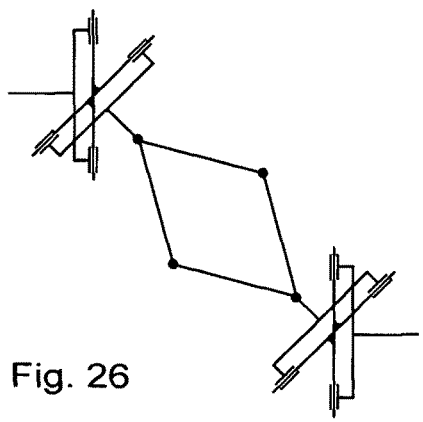

Scalability of the arrangement according to the present invention consists in that its power may be adjusted according to current requirements by simple attaching or detaching appropriate number of modules, both in place of its assembling or maintenance inspection place as well as at different locations of utilization The invention shall be described and explained below in connection with the attached drawings on which:

FIG. 1 presents schematically the first embodiment of a module of the wave energy conversion arrangement according to the present invention in a perspective view;

FIG. 2 presents schematically the second embodiment of a module of the wave energy conversion arrangement according to the present invention in a perspective view;

FIG. 3 presents schematically the first embodiment of the wave energy conversion arrangement according to the present invention—based on the module of FIG. 1—in a perspective view;

FIGS. 4 and 5 present schematically the first embodiment of FIG. 3 in a longitudinal configuration in a top view;

FIG. 6 presents schematically the first embodiment of FIG. 3 in a longitudinal configuration in a side view;

FIGS. 7 and 8 present schematically the first embodiment of FIG. 3 in a transversal configuration in a top view;

FIG. 9 presents schematically the first embodiment of FIG. 3 in a transversal configuration in a side view;

FIGS. 10 and 11 present schematically the first embodiment of FIG. 3 in a hybrid configuration comprising two sections of a transversal configuration coupled together into a longitudinal configuration in a top view;

FIGS. 12-13 present schematically the embodiment of the wave energy conversion arrangement according to the present invention of a transversal configuration alternative relative to the arrangement of FIGS. 7-8, in a top view;

FIG. 14 presents schematically the second embodiment of the wave energy conversion arrangement according to the present invention—based on the module of FIG. 2—in a perspective view;

FIGS. 15 and 16 present schematically present schematically the second embodiment of FIG. 14 in a longitudinal configuration in a top view;

FIGS. 17 and 18 present schematically present schematically the second embodiment of FIG. 14 in a transversal configuration in a top view;

FIGS. 19 and 20 present schematically the second embodiment of FIG. 14 in a hybrid configuration comprising two sections of a transversal configuration coupled together into a longitudinal configuration in a top view;

FIGS. 21-23 present schematically the first embodiment of the means for coupling main power transmission axles of the adjoining modules of the arrangement according to the present invention;

FIGS. 24-26 present schematically the second embodiment of the means for coupling main power transmission axles of the adjoining modules of the arrangement according to the present invention.

Wave energy conversion arrangement according to the present invention is based on a serial coupling of a number of modules with each other, wherein exemplary embodiments of the modules are presented in FIGS. 1, 2.

On all figures, blackened filled squares represent fixed, non-sliding connections between given elements; blackened filled circles represent articulated joints; empty circles represent rotational connections; and empty squares represent non-sliding detachable connections. Furthermore dashed lines represent connections that are enabled to be activated, while solid lines represent active/activated connections.

The first embodiment of the module 1 of the wave energy conversion arrangement according to the present invention presented in FIG. 1 comprises two first floats P1 and one second float P2. The first floats P1 are distanced from each other at a predetermined distance, and are connected to each other by a rigid connection structure 2. The second float P2 is located between the first floats P1, and is connected with the connecting structure 2 (and thus indirectly also with the first floats P1) in a sliding manner by means of a guiding arrangement 3, which in a general case comprises a guide 3, connected for example with the structure 2, and a slide 5, connected for example with the second float P2. The second float P2 is displaced out from between said first floats P1 in the direction of the longitudinal axis O1 of the module such that the second float P2 does not overlap with the first floats P1 in the transverse direction of the module. The connection by means of the guiding arrangement 3 provides mechanical coupling between the first and second floats P1, P2, that enables for intermutual and independent, reciprocal displacing of these floats in relation to each other along separate straight lines parallel to each other. The displacement is limited to a predetermined length segment symbolically depicted by stops 6 located on the slide 5. As many various possibilities of practical realization of the guiding arrangement 3 are known from the prior art, and as the structure of the guiding arrangement 3 as such is not the gist of the present invention, therefore this arrangement is not the subject of a further detailed discussion.

Except for a mechanical coupling, the first floats P1 are coupled with the second float P2 also energetically by means of an elementary energy conversion arrangement 7 that converts reciprocating movement of the first floats P1 relative to the second float P2 of the module 1 of a variable amplitude, preferably into a unidirectional rotational movement or a working medium flow.

In the presented embodiment, elementary energy conversion arrangement 7 comprises a mechanical gearing in a form of a linear toothed gear comprising a toothed bar 8 connected with the second float P2, which bar drives a toothed wheel 9 connected with the first floats P1 by means of the connecting structure 2 on which the wheel 9 is fixed. The coupling between the toothed gear 8 and the toothed wheel 9 is realized in such a manner that in the presented module 1 bidirectional, reciprocal movement of the first floats P1 relative to the second float P2 of a variable amplitude induced by wave energy is converted into energy of still unidirectional rotational movement of the toothed wheel 9. The toothed wheel 9 drives in turn the main power transmission axle 10 fixed also on the connecting structure 2.

In order to secure the elementary energy conversion arrangement 7 against mechanical overload, a buffer element temporarily accumulating a part of an energy excess absorbed by a float may be installed in a chain of a connection between one of the floats P1, P2 with this elementary energy conversion arrangement. Such a buffer element may be for example a spring 11 installed between the second float P2 and the toothed bar 8.

The second embodiment of the module 1 of the wave energy conversion arrangement according to the present invention presented in FIG. 2 comprises one first float P1 and one second float P2, which are mechanically coupled together in a manner analogical to the coupling of the floats from FIG. 1, with one difference consisted in that the guiding arrangement 3 is fastened to a structure 2 which in this embodiment constitutes a supporting structure. The second float P2 is displaced out relative to the first float P1 in the direction of the longitudinal axis O1 of the module such that the second float P2 does not overlap with the first float P1 in the transverse direction of the module. To the supporting structure is also fixed an elementary energy conversion arrangement 7 using reciprocal movement of the first float P1 relative to the second float P2 of the module, and in particular the housing 12 of the 1 pump arrangement, whereas to the second float P2 is connected a driving element 26 of the pump arrangement such as for example a piston rod of a pump. Thus in the presented module 1, reciprocal movement of the first float P1 relative to the second float P2 induced by wave energy is converted into energy of movement of working medium pumped by said pump arrangement 12. As many various possibilities of practical realization of the pump arrangement are known from the prior art, and as the structure of the pump arrangement as such is not the gist of the present invention, therefore this arrangement is not the subject of a further detailed discussion. Similarly to the module of FIG. 1, it is possible to install protecting buffer element securing against a damage of the pump arrangement, for example in a form of a spring 11 located on the connection of the second float P2 with the pump arrangement 12.

FIG. 3 presents the first embodiment of the wave energy conversion arrangement 13 according to the present invention based on the connection of four modules M1, M2, M3, M4 that are such as the module depicted in FIG. 1. For increasing readability, FIG. 3 does not depict guiding arrangements and the elementary energy conversion arrangements are represented only by the main power transmission arrangements 10. Furthermore, the float arrangement is divided into rows denoted by letters M provided with appropriate numbers indicating individual modules, and columns denoted by letters P provided with appropriate numbers indicating individual floats of the modules.

In the embodiment presented the second floats P2 are on one hand completely displaced out of the first floats P1 of a given module in the direction of the longitudinal axis O1 of the module, and on the other hand they are completely inserted in between the first floats P1 of the adjoining module.

Main power transmission axles 10 of the adjoining modules M1, M2, M3, M4 of the arrangement 13 are connected to each other by coupling means 14 enabling for intermutual and independent, reciprocal displacing these axles 10 in relation to each other along separate straight lines of sliding relative movement of the first floats P1 which the axles 10 are fixed to. Chain-coupled axles 10 form the main energy conversion arrangement 15 extending over the whole arrangement 13 along all of the modules M1, M2, M3, M4 thereof. Obviously an energy receiver, such as for example generator or motor, may be coupled with the main energy conversion arrangement 15.

The arrangement 13 comprises also connecting means 16 for appropriate alternative, detachably connecting the floats P1, P2 of the adjoining modules M1, M2, M3, M4 with each other.

The connecting means 16 most generally comprise three types of means:
   the first connecting means 17 for detachably connecting the first floats P1 (for example P1M1) of a given module (for example M1) with the second floats P2 (for example P2M2) of the adjoining module (for example M2);
   the second connecting means 18 for detachably connecting the first floats P1 (for example P1M1) of a given module (for example M1) with the first floats P1 (for example P1M2) of the adjoining module (for example M2); and the third connecting means 19 for detachably connecting the second floats P2 (for example P2M1) of a given module (for example M1) with the second floats P2 (for example P2M2) of the adjoining module (for example M2).

The arrangement presented in FIG. 3 is provided with all three types of the connecting means 17, 18, 19 constituting the most preferable embodiment which provides the maximum number of configurations of connections between the floats P1, P2 of the modules M1, M2, M3, M4 of the arrangement 13.

Nevertheless, the present invention requires only that the present wave energy conversion arrangement comprises the first connecting means 17 and solely at least one connecting means chosen from the group comprising second and third connecting means 18, 19. For example another embodiment of the arrangement 13 according to the present invention as presented in FIGS. 4-11 comprises only the first and second connecting means 17, 18.

According to the present invention the alternativeness of using of connecting means of particular types consists in that in respect of the adjoining modules in a case of an active state of the first connecting means 17 (the first connecting means are connected), all the remaining second and/or third connecting means 18, 19 are in an inactive state (all the second and/or third connecting means are disconnected). Whereas in a case of an inactive state of the first connecting means 17, the remaining second and/or third connecting means 18, 19 are activated.

Many various solutions appropriate for direct (or after obvious modification) employment as the connecting means according to the present invention are known from the prior art. Therefore concerning that the structure of particular connecting means 16-19 as such is not the gist of the present invention, therefore the structure of individual connecting means 16-19 is not the subject of a further detailed discussion.

FIGS. 4-13 present three different configurations of connections between the floats of the modules of the arrangement 13 from FIG. 3 in a top view and a side view.

In the configuration presented in FIGS. 4-6, the first connecting means 17 are activated coupling the first floats P1 of the modules M2-M4 with the second floats P2 of the adjoining modules M1-M3.

FIG. 5 depicts the conformation of the combination floats P1M2/P2M1/P1M2, P1M3/P2M2/P1M3, P1M4/P2M3/P1M4 of a rectangular shape formed in a result of activation of the first connecting means 17. In this configuration, the arrangement 13 constitutes a longitudinal arrangement in which particular elementary energy conversion arrangements 7 convert energy of intermutual movement of the adjoining combination floats formed using the first connecting means 17. FIG. 6 depicts the principle of operation of the arrangement in the longitudinal configuration, in which the energy of intermutual dislocations between the adjoining floats/combination floats induced by the wave F is converted.

In the configuration depicted in FIGS. 7-9, the second connecting means 18 are activated connecting the first floats P1 of the adjoining modules M1-M4 with each other. FIG. 8 depicts the structure comprising two outer combination floats P1M1/P1M2/P1M3/P1M4 formed in a result of activation of the connecting means 18, wherein the combination floats surround the second floats P2 of these modules M1-M4 on both sides. In this configuration the arrangement 13 constitutes a transversal arrangement in which particular elementary energy conversion arrangements 7 convert energy of intermutual movement of the second floats P2 of all modules M1-M4 relative to the combination floats formed by activated connecting means 18. FIG. 9 depicts the principle of operation of the arrangement in the transversal configuration, in which the energy of individual dislocations of the second floats P2 induced by the wave F relative to the combination (reference) floats P1M1/P1M2/P1M3/P1M4 that are substantially nonmoving relative to the wave F is converted.

In the configuration presented in FIGS. 10, 11, the first connecting means 17 are activated coupling the first floats P1 of the module M3 with the second float P2 of the adjoining module M2, and the second connecting means 18 are activated coupling the first floats P1 of the modules M1-M2 with each other and coupling the first floats P1 of the modules M3-M4 with each other. FIG. 10 depicts the arrangement of the combination floats formed in a result of activation of the connecting means 17, 18. In such a configuration, the arrangement 13 comprises two corresponding first combination floats P1M1/P1M2 and one second combination float P1M3/P1M4/P2M2/P1M3/P1M4.

The configuration presented in FIGS. 9-10 is a hybrid configuration comprising two sections M1/M2 and M3/M4 having a transversal arrangement structure in which the reference floats (including the first combination floats and the second combination float; wherein the floats P2M1, P2M3, P2M4 in this subarrangements may be called as driving floats) are connected with each other forming the longitudinal arrangement.

FIGS. 12, 13 present an alternative transversal configuration of the wave energy conversion arrangement from FIG. 3, in which the second connecting means 18 are replaced by the third connecting means 19 designed for coupling with each other the second floats P2 of the adjoining modules M1-M4. An activation of the third connecting means 19 resulted in transformation of the arrangement 13 into the transversal configuration having one central combination reference float P2M1/P2M2/P2M3/P2M4 surrounded on both sides by the rows of the driving floats P1 of all modules M1-M4.

FIGS. 14-20 present another embodiment of the wave energy conversion arrangement 13 according to the present invention based on connection of four modules M1, M2, M3, M4 which are the same as the module presented in FIG. 2. For improving readability, FIG. 17 does not depict guiding arrangements.

The pump arrangements 12 of the adjoining modules M1-M4 are chain-coupled by means of deformable conduits 20 forming the main energy conversion arrangement 15. The directions of working medium flows generated by all pump arrangements 12 are obviously the same.

In order to enable for independent vertical dislocations of individual pump arrangements 12 the lengths of the deformable conduits 20 are significantly greater than the distances between the straight lines of movements of the adjoining pump arrangements 12 measured in the direction of the longitudinal axis O1 of the arrangement 13. In a result in the state of the arrangement 13 presented in FIG. 17 where all the pump arrangements 12 are located on one level, the deformable conduits 20 form sags.

The arrangement 13 is provided with two types of the connecting means 16 comprising the first connecting means 17 for detachably connecting the first floats P1 of the modules M2-M4 with the second floats P2 of the adjoining modules M1-M3, and the second connecting means 18 for detachably connecting the first floats P1 of the adjoining modules M1-M4 with each other.

FIGS. 15, 16 present a longitudinal configuration of the arrangement 13 obtained in a result of activation of the all first connecting means 17, in which three rectangular combination floats P1M2/P2M1, P1M3/P2M2, P1M4/P2M3 exist.

FIGS. 17, 18 present a transversal configuration of the arrangement 13 formed after an activation of all second connecting means 18 resulting in forming one combination reference float P1M1/P1M2/P1M3/P1M4.

In a configuration presented in FIGS. 19, 20, the first connecting means 17 are activated coupling the first floats P1 of the modules M3 with the second float P2 of the adjoining module M2, and the second connecting means 18 coupling the first floats P1 of the modules M1-M2 together and coupling the first floats P1 of the modules M3-M4 together. FIG. 20 depicts the arrangement of the combination floats formed in a result of activation of the connecting means 17, 18. In this configuration, the arrangement 13 comprises one first combination reference float P1M1/P2M2 and one second combination float P1M3/P1M4/P2M2. The configuration presented in FIGS. 19-20 is a hybrid configuration comprising two sections M1/M2 and M3/M4 having transversal configurations in which the reference floats (including the first combination float and the second combination float; wherein the floats P2M1, P2M3, P2M4 in this subarrangements may be called as driving floats) are connected with each other forming a longitudinal configuration.

The skilled technician is obviously aware of a possibility of employment of a pump arrangement comprising synchronously propelled underpressure subarrangement and overpressure arrangement, each of which is designed for coupling by means of separate series of underpressure and overpressure conduits corresponding to conduits 20. In such a case, each module shall be for example provided with a pair of hydraulic conduits comprising one underpressure conduit and overpressure conduit disposed horizontally and parallelly to each other and fixed to the constructional frame of a given module, wherein the conduits are coupled between the modules by means of elastic connectors enabling for intermutual dislocations of these conduits with relation to each other. In each module, a pump arrangement may be in such a case connected with said pair of conduits in such a manner that regardless of the direction of the pump piston movement, working medium shall be always pumped from the underpressure conduit to the overpressure conduit. The ends of the hydraulic conduits on the beginning or on the end of the arrangement may be connected to a hydraulic motor, which in turn may be coupled with a generator (the opposite ends may be closed or connected to the second motor-generator assembly).

FIGS. 21-23 present first exemplary means 14 for coupling together main power transmission axles 10 of the adjoining modules of the arrangement according to the present invention provided with a mechanical gearing in a form of a telescopic jointed shaft 21 comprising two universal joints 22 connected at the outer sides to the axles 10 and at the inner sides connected to a telescopic element 23. FIG. 23 presents a state of the shaft 21 in a position of the maximal closeup of the axles 10 on the direction of a dislocation thereof along the straight lines parallel to each other, wherein FIG. 24 presents a state of the shaft 21 in a position of the maximal distance between the axles 10 on the direction of a dislocation thereof along the straight lines parallel to each other.

FIGS. 24-26 present second exemplary means 14 for coupling together main power transmission axles 10 of the adjoining modules of the arrangement according to the present invention provided with a mechanical gearing in a form of a pantographic jointed shaft 24 comprising two universal joints 22 connected at the outer sides to the axles 10 and at the inner sides connected to a pantographic element 25 jointedly coupled with the joints 22.

FIG. 26 presents a state of the shaft 24 in a position of the maximal closeup of the axles 10 on the direction of a dislocation thereof along the straight lines parallel to each other, wherein FIG. 27 presents a state of the shaft 24 in a position of the maximal distance between the axles 10 on the direction of a dislocation thereof along the straight lines parallel to each other.

The arrangements according to the present invention may be preferably provided also with a connecting means enabling for a connection of all floats together with each other into one structure. In this state of a blockage of intermutual displacement of all floats and all modules with relation to each other, the whole arrangement resembles a monoblock hull which may be towed by a tug boat.

The above embodiments of the present invention are merely exemplary. The figures are not necessarily to scale, and some features may be exaggerated or minimized. The presented embodiments should not be considered as limiting the spirit of the invention, the intended scope of protection of which is indicated in appended claims.

The invention claimed is:

1. A mobile wave energy conversion arrangement comprising
    at least two modules (M1, M2) aligned serially with each other forming a row defining a longitudinal axis (O1) of the wave energy conversion arrangement, each of which comprises
    a pair of first floats (P1) aligned serially with a pair of first floats (P1) of the adjoining module (M1, M2) along the longitudinal axis, and at least one second float (P2) offset from said pair of first floats (P1) along the longitudinal axis, said pair of first floats (P1) and said at least one second float (P2) being coupled mechanically with each other so that to enable reciprocating displacing of these floats in relation to each other over a predetermined length along separate straight lines parallel to each other;
    at least one elementary arrangement (7) configured to convert energy using reciprocating movement of said pair of first floats (P1) of a given module (M1, M2) relative to said at least one second float (P2) of the given module (M1, M2);
    connecting means (16) configured to alternatively detachably connect
    said pair of first floats (P1) of a given module (M1, M2) with said at least one second float (P2) of an adjoining module (M1, M2) fixedly and transversely relative to the longitudinal axis (O1),
    said pair of first floats (P1) of a given module (M1, M2) with said pair of first floats (P1) of the adjoining module (M1, M2) fixedly and longitudinally relative to the longitudinal axis (O1) and said at least one second float (P2) of a given module (M1, M2) with said at least one second float (P2) of the adjoining module (M1, M2) fixedly and longitudinally relative to the longitudinal axis (O1),
    wherein said at least one elementary arrangement (7) of one of the adjoining modules (M1, M2) is energetically coupled to the at least one elementary arrangement (7) of another one of the adjoining modules (M1, M2) forming a main energy conversion arrangement (15).

2. The wave energy conversion arrangement according to claim 1, characterised in that each of said elementary arrangements (7) comprises a mechanical gearing driving a main power transmission axle (10), wherein the main power transmission axle (10) of one of the adjoining modules (M1, M2) is connected to the main power transmission axle (10) of another one of the adjoining modules (M1, M2) by means (14) so that to enable independent displacing of these axles (10) in relation to each other along straight lines of displacement of the floats to which floats the axles (10) are fixed to.

3. The wave energy conversion arrangement according to claim 2, characterised in that the power transmission axles (10) of the adjoining modules are coupled with each other by a telescopic jointed shaft (21) or a pantographic jointed shaft (24).

4. The wave energy conversion arrangement according to claim 2, characterised in that said mechanical gearing is a linear toothed gear comprising a toothed bar (8) connected with one of the first floats (P1) of said pair of first floats (P1) or the second float (P2) of a given module (M1, M2) which drives a toothed wheel (9) connected respectively with the second float (P2) or one of the first floats (P1) of said pair of first floats (P1) of the module (M1, M2), wherein the gearing is configured to convert a reciprocal movement of the toothed bar (8) of a variable amplitude into a unidirectional rotational movement of the main power transmission axle (10).

5. The wave energy conversion arrangement according to claim 1, characterised in that each of said elementary arrangements (7) comprises a pump arrangement (12).

6. The wave energy conversion arrangement according to claim 5, characterised in that the pump arrangements (12) of the elementary arrangements (7) coupled together are connected with each other fluidly and unidirectionally by means (20), so that to enable independent displacing of these pump arrangements (12) in relation to each other along straight lines of displacement of the floats (P1) which the pump arrangements (12) are fixed to.

7. The wave energy conversion arrangement according to claim 1, characterised in that the pair of first floats (P1) or the second float (P2) of a given module is located next to respectively the second float (P2) or the pair of first floats (P1) of the adjoining module.

8. The wave energy conversion arrangement according to claim 1, characterised in that at least one second float (P2) of a given module is located between the first floats (P1) of the pair of first floats (P1) of the adjoining module connected with each other by a connecting structure (2).

9. The wave energy conversion arrangement according to claim 1, characterised in that in one module (M1) at least one second float (P2) is located between the first floats (P1) of the pair of first floats (P1) connected with each other by a connecting structure (2).

* * * * *